Dec. 11, 1951     K. M. KÖLBL     2,578,252
SUSPENSION BAR FOR VERTICALLY SUSPENDING PLANS, DRAWINGS, MAPS
AND THE LIKE IN STORAGE CABINETS
Filed Sept. 21, 1948
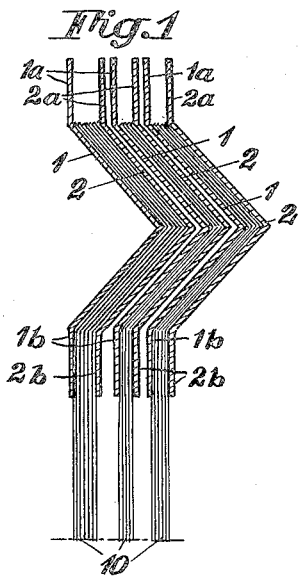
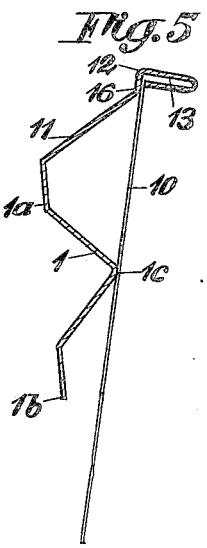
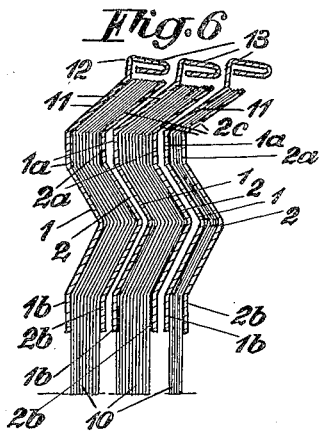
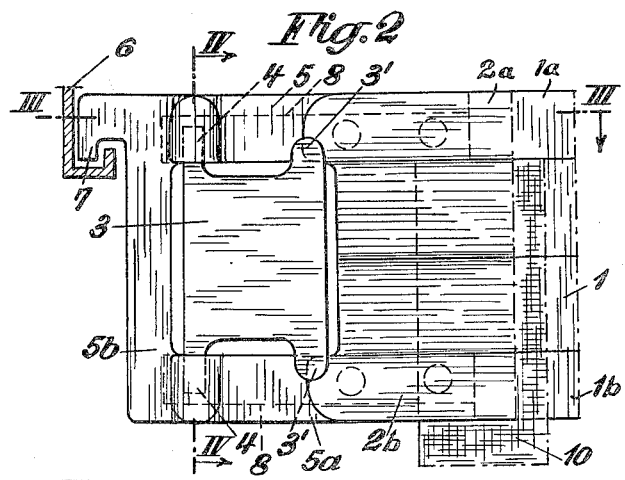
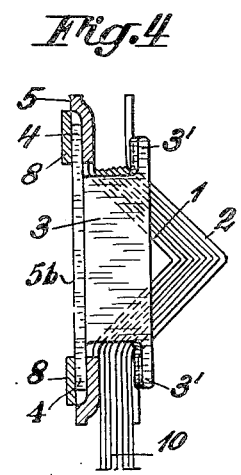
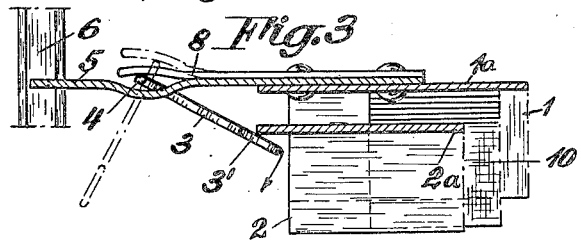
Inventor
K. M. Kölbl Patented Dec. 11, 1951

2,578,252

UNITED STATES PATENT OFFICE 2,578,252

SUSPENSION BAR FOR VERTICALLY SUSPENDING PLANS, DRAWINGS, MAPS, AND THE LIKE IN STORAGE CABINETS

Karl Maria Kölbl, Vienna, Austria

Application September 21, 1948, Serial No. 50,356
In Austria October 1, 1947

5 Claims. (Cl. 129—16.7)

The present invention relates to an improvement in suspension bars for suspending sheets such as plans, drawings, maps and the like in storage receptacles or cabinets having spaced stationary rails embodied therewith.

The invention further relates to suspension bars in which each comprises two separate bar elements and resiliently operable clamping means urging one bar toward the other.

More particularly the invention relates to suspension bars embodying a cross sectional contour to enhance a clamping effect and an arrangement which simplifies the insertion and removal of sheets and one which utilizes a minimum of space in a storage cabinet or receptacle.

It is therefore an object of the present invention to provide suspension bars of angular profile having at least an intermediate portion displaced out of the vertical plane in a horizontal direction to provide an elbow or bend open toward the plane of suspension and permitting a nesting arrangement of a plurality of suspension bars.

It is an additional object to provide a suspension bar arrangement in which each bar includes complementary elements of angular profile and in which one bar has embodied therewith carrying or supporting means in cooperation with the guide rails of the storage cabinet and the supported bar carrying the clamping means for cooperation with the other bar to clamp the bars together with sheets therebetween.

Further and more specific objects will be apparent from the following description taken in connection with the accompanying drawings, in which:

Figure 1 illustrates in cross section the angular shape of the suspension bars of the invention and showing a plurality of such bars in nested relationship, Figure 2 is a front elevational view of one end of the suspension bar in accordance with the invention, Figure 3 is a horizontal section taken on line III—III of Figure 2, Figure 4 is a section taken on line IV—IV of Figure 2, Figure 5 illustrates a modification of the cross sectional profile on cross sectional form of the suspension bar, and Figure 6 illustrates in cross section the assembly of a plurality of suspension bars modified in accordance with the arrangement of Figure 5 and disposed in nested relationship.

As indicated in the drawings, each suspension bar includes two component bars 1 and 2. As shown in Figure 1, the central section of the bars comprise legs connected together at right angles to provide a bend which is open toward the vertical plane of suspension. Extending from the legs of the angled sections are upper and lower aligned straight portions 1a and 1b and 2a and 2b respectively. These portions are at obtuse angles with respect to legs of the angled intermediate section. These aligned straight portions project beyond the lateral edges of the angled intermediate section to provide, as shown in Figures 2-4, upper and lower supporting and stiffening arms 5 and 5a on the bar 1. The supporting arms 5 are further provided with hooked ends 7 to cooperate with the flanges of the guide rail 6 of a pair of rails in a cabinet, not shown. As indicated a hook 7 is provided at the opposite end of each supporting bar assembly to cooperate with the spaced rail 6 and the supporting bars are thus displaceable along the rails. The bars 1 and 2 of the supporting bar assembly further include resilient clamping means. As shown in Figure 2, the pressure plates 3 have flat or elliptical pivots 4 extending from opposite ends thereof and journaled in recesses or indentations provided in the upper and lower arms 5 and 5a respectively of the bar 1. The plate 3 has at its opposite end upper and lower projections 3' for engagement against the projecting ends of the portions 2a and 2b of the bar member 2. The pressure plate 3 is normally resiliently urged into contact with the bar 2 by means of springs 8 riveted to the upper and lower arms 5 and 5a respectively and having their ends cooperating with the pivots 4 in the plate 3. As shown, the plate 3 swings about an axis extending at right angles to the longitudinal axis of the suspension bar assembly and the particular arrangement of spring means embodied with each of the bars 5 and 5a assures that pressure will be applied to the bar 2 on opposite sides of the intermediate angled portion to an equal extent. In the particular arrangement shown the guide rails 6 are L-shaped in section and the profile of the hook 7 on the ends of the bars 1 is such that these bars are loosely insertable between the flanges of the guide rail but the lower shorter flange of the rail cooperates with the hook to prevent unintentional displacement of the supporting bars from the rails. The bars, however, are readily removable from above, as apparent from Figure 2.

In instances where a plurality of supporting bar assemblies are mounted within a single storage receptacle in nested relationship, as shown in Figure 1, it is necessary for removing any one suspension bar to displace the contiguous bar or bars with respect thereto. In utilizing the invention when a suspension bar having sheets clamped between the bar components 1 and 2 is removed from the cabinet the pressure plates 3 are turned in the direction of the arrow in Figure 3 and against the action of the springs 8, whereby the clamping bar 2 is relieved of pressure. Then the clamping bar 2, now freely accessible, is removed so that the sheets, previously clamped by the same, are released for adding or removing a sheet. Then the two clamping bars 1 and 2 are placed one on top of each other with the sheets therebetween, and each small pressure plate 3 is again turned over into the pressure applying position as shown in Figures 2 and 3 in which the plate 3, through its projections 3′ engages the lateral extensions 2a and 2b of the clamping bar 2, and urges the same against the pile of sheets and toward bar 1 to clamp the bars together.

For preventing a fracture or deformation of the supporting arms 5 and 5a the same may be given a suitably resistant profile, or may be connected with each other by a cross-web or transverse web 5b for the purpose of enhancing the carrying capacity. The supporting arms 5, 5a and 5b may also be riveted to the carrying rails 1a and 1b.

It should be noted in this connection that an angle of 90 degrees is the most suitable for the relationship of the legs of the angled intermediate section of the clamping bars; because said angle, as seen from Fig. 1 of the drawing, warrants the smallest distance-loss between the individual suspension bars. Of course, it is possible to make the clamping bar profile into an acute or an obtuse angle according to the requirements without too seriously impairing the effect sought by the invention. For large-size sheets, clamping-bars of greater clamping capacity may be used presenting a repeatedly buckled profile for the purpose of enhancing the clamping effect.

Figures 5 and 6 illustrate a modification of the invention in which the respective bar members 1 and 2 of each suspension bar assembly are modified on their upper ends to provide additional clamping surfaces to enhance the clamping effect on the sheets held therebetween. As shown in Figure 5, each clamping bar 1 in addition to the extensions 1a and 1b is provided with a further extension projecting from the upper marginal edge of extension 1a. This further extension includes an angled section 11 inclined with respect to section 1a and an abutment surface 12 extending upwardly from the end of section 11 and a double wall projection 13 terminating closely adjacent the abutment section 12. This section 12 is located in a horizontal plane rearwardly of the vertex 1c of the intermediate angle section of the clamping bar 1. The double wall section 13 is provided with window openings and between the walls of which are inserted index strips having indicia thereon corresponding to the particular plans, drawings or maps clamped by the particular suspension bar, the indicia being visible through the openings. The longer extension 11 forms a vertex 16 with the abutment edge extension 12 and when a plurality of suspension bars modified as aforedescribed are assembled as shown in Figure 6 the double wall section or sleeve 13 of the clamping bar 1 of one suspension bar assembly abuts the vertex 16 of the next adjacent assembly whereby the assemblies mutually support one another.

The clamping bar 2 of each assembly is likewise modified at its upper end in that the extensions 2a are provided with further extensions 2c having the same angular relationship as the extensions 11 and cooperable with the extensions 11 increasing the clamping effect on sheets or plans held by the bars 1 and 2 as modified. It is obvious, therefore, that the additional angled surfaces 11 and 2c materially increase the clamping action on the plans or sheets.

It is therefore clear that I have provided a suspension bar assembly including a supported bar and an active clamping bar, each bar having complementary angled intermediate sections or portions having major and minor axes and upper and lower straight sections extending from the intermediate sections, the upper and lower sections being in alignment with one another and provided with lateral extensions projecting beyond the lateral or opposite side edges of the intermediate sections, the extensions of the supported bar being longer than the extensions of the other bar and the upper longer extension of each supported bar having a hook at each end for cooperation with the rail in the storage receptacle. Further, this upper extension, which constitutes the supporting arm, is connected to the lower extension or arm by a transverse web. Additionally, the upper and lower arms of the supported bar are provided with recesses or indentations receiving pivots of the pressure plates and spring means act on the pressure plates to cause the opposite ends thereof to engage the lateral extensions of the other or active clamping bar.

In the modifications disclosed in Figures 5 and 6 additional extensions are provided on the upper arms of each bar, the additional extension on the supporting bar having offset portions including a portion bent upon itself to provide a sleeve or double wall portion for receiving indicia bearing means such as a strip. It is evident from the drawings that when a plurality of supporting bars are arranged in contiguous nesting relationship the double wall section of one bar will abut the short connecting portion of the supporting bar of the next adjacent section.

Having now described my invention what I claim is:

1. A suspension bar for vertically suspending sheets such as plans, drawings, maps, and the like in storage receptacles having spaced stationary rails embodied therewith, comprising a pair of complementary clamping bars each having in section two legs defining a right angle therebetween, said legs having major and minor axes and opposite side edges, aligned extensions projecting outwardly from the legs in the direction of the minor axes and at obtuse angles with respect to the legs, said extensions lying substantially in the vertical plane of suspension of the sheets and having a greater lateral extent in the direction of the major axes of the legs providing the right angled section and projecting beyond both side edges thereof, the extensions of one bar projecting laterally beyond the extensions of the other, hook means embodiment with the extensions of said one bar and cooperable with the rails for supporting the same whereby the said one bar constitutes a supported bar and is displaceable relative to the rails, clamping means carried by the extensions of the said one supported bar outwardly of the side edges of the legs and including resilient means and an element operable thereby in one direction to be engageable with the extensions of the said other bar to move said other bar toward the supported bar to thereby clamp at least one sheet between the bars, and said element being movable against the action of said resilient means to release the clamping effect to permit the removal and insertion of sheets between the bars and disassociation of said other bar from the supported bar.

2. Suspension bars for vertically suspending sheets such as plans, drawings, maps, and the like in storage receptacles having spaced stationary rails embodied therewith, comprising a pair of complementary clamping bars each including clamping surfaces including an intermediate portion comprising upper and lower legs at right angles to each other, said legs having opposite side edges and major and minor axes and being disposable in nesting relationship, aligned extensions projecting outwardly from the respective legs at obtuse angles thereto and extending in the direction of the major axes of the legs and constituting upper and lower reinforcing and supporting arms lying substantially in the vertical plane of suspension of the sheets, said arms projecting laterally beyond the respective side edges of the legs, an additional extension projecting from the upper arms of each bar in a direction of the minor axes of the upper legs and at an angle to each upper bar to provide an additional major clamping surface, the said additional extensions being parallel to each other when the bars are in nested relationship, hook means embodied with the arms of one bar and cooperable with the rails whereby said one bar constitutes a supported bar displaceable along the rails, and clamping means carried by the arms of the supported bar including a resiliently operable pressure applying element normally urged toward the bar and engageable with the arms of the other bar to clamp the bars together with the sheets therebetween and said element being movable outwardly of the bars to release the clamping effect to permit removal and insertion of sheets between the bars and disassociation of said other bar from the supported bar.

3. Suspension bars for vertically suspending sheets such as plans, drawings, maps, and the like in receptacles having spaced stationary rails embodied therewith, including a pair of bar members each having complementary clamping surfaces to receive sheets therebetween comprising upper and lower legs at right angles to each other, said legs having major and minor axes and opposite side edges and being disposable in nesting relationship to constitute a suspension bar unit, extensions projecting outwardly from the respective legs at obtuse angles thereto and extending in the direction of the minor axes of the legs and constituting upper and lower reinforcing and supporting arms lying substantially in the vertical plane of suspension of the sheets, the said arms projecting beyond both side edges of the legs in the direction of the major axes thereof, an additional extension projecting from each upper arm including a first portion at an angle to each upper arm and extending in the direction of the minor axes of the legs, the said first portions being parallel to one another to provide additional clamping surfaces, said additional extension of one bar including an integral portion bent upon itself to provide a double wall portion offset from said first portion, a short connecting portion lying between the double wall portion and the first portion providing the offset relationship of the first mentioned portions, said connecting portion being at an angle to said first portion so that when a plurality of suspension bars are assembled in a receptacle in contiguous nested relationship the double wall portion of one bar engages the apex of the angle between the connecting portion and the first portion, the said one bar having supporting means at opposite ends thereof for cooperation with the rails so that said one bar constitutes a supported bar, and clamping means carried by the ends of said one bar including a movable resiliently operable pressure applying member normally movable toward the said one bar and engageable with the arms of the other bar to clamp the bars together with sheets therebetween, said member being movable away from said one bar to release the clamping effect to permit removal and insertion of sheets and disassociation of said other bar from the supported bar.

4. Suspension bars for vertically suspending sheets such as plans, drawings, maps and the like in receptacles having spaced stationary rails comprising a pair of complementary bar elements each having in its cross section upper and lower aligned straight portions lying substantially in the vertical plane of suspension of the sheets to be supported and an intermediate portion including legs connected to each other at right angles and connected to the respective upper and lower straight portions at obtuse angles, said intermediate portions being uninterrupted and constituting sheet engaging surfaces, the straight portions extending laterally beyond both ends of the intermediate portions and terminating in opposite ends, the opposite ends of the straight portions of one bar element extending beyond the opposite ends of the straight portions of the other bar element when the elements are superimposed, hook means embodied with the opposite ends of the straight portions of said one bar element for cooperation with the spaced rails to support the said one bar element for movement therealong, and resiliently operable clamping means embodied with both straight portions of the said one bar element including a pressure applying member engageable with the straight portions of the other bar element at areas laterally outward of the opposite edges of the intermediate portions to move the said other bar toward the said one bar element to clamp the bar elements together with sheets therebetween and said member being movable to an inoperative position so as to permit disassociation of the said other bar element from the said one bar element to provide for removal and insertion of sheets.

5. A suspension bar as defined in and by claim 4 in which the straight portions of the said one bar element projecting laterally beyond the ends of the intermediate portion constitute upper and lower arms and said arms having indentations therein in alignment with one another, and said resiliently operable clamping means including spring members carried by the arms and extending over the indentations and said pressure applying member comprising a plate having pivot means projecting from opposite edges thereof and disposable in the indentations beneath the spring members, said spring members cooperating with said pivot means to urge the plate to pressure applying clamping position and said plate having extensions on the opposite ends thereof parallel with the pivots for cooperative engagement with the straight portions of the said other bar element.

KARL MARIA KÖLBL.

REFERENCES CITED

The following references are of record in the file of this patent:

UNITED STATES PATENTS

| Number | Name | Date |
| --- | --- | --- |
| 528,130 | Pugh et al. | Oct. 23, 1894 |
| 546,492 | Millert | Sept. 17, 1895 |
| 1,134,616 | Johanson | Apr. 6, 1915 |
| 1,646,696 | Keays et al. | Oct. 25, 1927 |
| 1,753,366 | Lisle | Apr. 8, 1930 |
| 1,804,339 | Henschel | May 5, 1931 |

FOREIGN PATENTS

| Number | Country | Date |
| --- | --- | --- |
| 112,925 | Germany | 1900 |
| 129,598 | Switzerland | 1929 |
| 442,277 | Great Britain | 1936 |
| 629,951 | Germany | May 15, 1936 |
| 227,598 | Switzerland | Nov. 16, 1943 |